United States Patent
Calago et al.

(10) Patent No.: US 10,843,519 B2
(45) Date of Patent: Nov. 24, 2020

(54) INDEPENDENT FRONT AXLE SUSPENSION

(71) Applicants: ZOOMLION Heavy Industry NA, Inc., Yorkville, WI (US); ZOOMLION Heavy Industry Science and Technology Co. Ltd., Changsha (CN)

(72) Inventors: Edgar N. Calago, Yorkville, WI (US); Gregory M. Downs, Yorkville, WI (US); Alan D. Nickel, Yorkville, WI (US)

(73) Assignees: ZOOMLION HEAVY INDSUTRY NA, INC., Yorkville, WI (US); ZOOMLION HEAVY INDUSTRY SCIENCE & TECHNOLOGY CO, LTD., Changsha ( * ) Notice: Subject to any disclaimer, the term of this patent is extended or adjusted under 35 U.S.C. 154(b) by 90 days.

(21) Appl. No.: 16/367,397

(22) Filed: Mar. 28, 2019

(65) Prior Publication Data

US 2020/0307334 A1 Oct. 1, 2020

(51) Int. Cl.
*B60G 9/02* (2006.01)

(52) U.S. Cl.
CPC .......... *B60G 9/02* (2013.01); *B60G 2200/326* (2013.01); *B60G 2204/143* (2013.01); *B60G 2204/418* (2013.01)

(58) Field of Classification Search
CPC ................ B60G 9/02; B60G 2200/326; B60G 2204/143; B60G 2204/418
See application file for complete search history.

(56) References Cited

U.S. PATENT DOCUMENTS

| | | | | |
|---|---|---|---|---|
| 4,152,004 A | * | 5/1979 | Schroder | B60G 9/02 280/6.154 |
| 5,037,126 A | * | 8/1991 | Gottschalk | B60G 9/003 280/124.116 |
| 5,337,847 A | * | 8/1994 | Woods | A01G 23/083 144/4.1 |
| 5,513,875 A | * | 5/1996 | Tahara | B60G 9/02 280/124.112 |
| 5,639,119 A | * | 6/1997 | Plate | B62D 49/08 280/754 |
| 5,649,719 A | * | 7/1997 | Wallace | B60G 7/02 180/352 |
| 5,879,016 A | | 3/1999 | Altherr et al. | |
| 6,550,795 B1 | * | 4/2003 | Schlosser | B60G 7/02 280/124.116 |

(Continued)

*Primary Examiner* — Paul N Dickson
*Assistant Examiner* — Joselynn Y Sliteris
(74) *Attorney, Agent, or Firm* — Donald J. Ersler

(57) ABSTRACT

An independent front axle suspension preferably includes a front drive axle, an upper suspension frame, a lower suspension frame, a pair of hydraulic cylinders and a pair of pivot plates. A front pivot plate is attached to a front and middle of the front drive axle and a rear pivot plate is attached to a rear and middle of the front drive axle. A rear of the upper suspension frame is pivotally engaged with a rear of the lower suspension frame. A front and rear of the front drive axle is pivotally retained in the lower suspension frame with the pair of pivot plates. One end of the pair of hydraulic cylinders are preferably spherically retained on opposing sides of the upper suspension frame. An opposing end of the pair of hydraulic cylinders are preferably spherically retained on opposing ends of the front drive axle.

20 Claims, 4 Drawing Sheets

(56) References Cited

U.S. PATENT DOCUMENTS

| | | | |
|---|---|---|---|
| 6,851,689 B2 * | 2/2005 | Dudding | B60G 9/00 |
| | | | 280/124.128 |
| 6,945,548 B2 * | 9/2005 | Dudding | B60G 7/04 |
| | | | 267/122 |
| 7,296,809 B2 * | 11/2007 | Zebolsky | B60G 7/006 |
| | | | 280/124.116 |
| 7,510,198 B2 | 3/2009 | Rach et al. | |
| 7,658,412 B2 * | 2/2010 | Ramsey | B60G 7/02 |
| | | | 280/784 |
| 8,998,229 B2 * | 4/2015 | Michel | B60G 9/003 |
| | | | 280/124.116 |

* cited by examiner

INDEPENDENT FRONT AXLE SUSPENSION

BACKGROUND OF THE INVENTION

1. Field of the Invention

The present invention relates generally to heavy equipment and more specifically to an independent front axle suspension, which reduces the amount of discomfort experienced by an operator from the front axle motion during travel.

2. Discussion of the Prior Art

U.S. Pat. No. 5,879,016 to Altherr et al. discloses a pivoting spring-mounted axle. U.S. Pat. No. 7,510,198 to Rach et al. discloses an axle suspension system. An independent front axle suspension will allow the front axle to pivot along the drive shaft axis to allow for individual tire movement without affecting the tractor frame. The independent front axle suspension will also allow an entire front axis to pivot along an axis perpendicular to a drive shaft, which will not induce tractor frame movement. Additionally, the front axle oscillation will be dampened with the use of hydraulic cylinders and accumulators. The hydraulic cylinders will have also include spherical bearings.

Accordingly, there is a clearly felt need in the art for an independent front axle suspension, which reduces the amount of discomfort experienced by an operator from the front axle, relative to a dependent front axle which has little load dampening.

SUMMARY OF THE INVENTION

The present invention provides an independent front axle suspension, which reduces the amount of discomfort experienced by an operator from the front axle during travel. The independent front axle suspension preferably includes a front drive axle, an upper suspension frame, a lower suspension frame, a pair of hydralic cylinders and a pair of pivot plates. The front drive axle includes a first drive spindle, a second drive spindle, a first cylinder yoke and a second cylinder yoke. The first drive spindle extends from a first end of the front drive axle and the second drive spindle extends from a second end of the front drive axle. The first cylinder yoke is located on a front of the front drive axle, adjacent the first drive spindle. A first slot in the first cylinder yoke is parallel to a lengthwise axis of the front drive axle. The first slot is sized to receive a rod end of a first hydraulic cylinder. The second cylinder yoke is located on a front of the front drive axle, adjacent the second drive spinde. A second slot in the first cylinder yoke is parallel to a lengthwise axis of the front drive axle. The second slot is sized to receive a rod end of a second hydraulic cylinder. Each pivot plate includes a mounting base and a pivot extension. The pivot plate includes a plurality of mounting holes. The pivot extension includes a base boss and a pivot diameter, which extends outward from the base boss. A front pivot plate is attached to a front and middle of the front drive axle with a plurality of fasteners. A rear pivot plate is attached to a rear and middle of the front drive axle with the plurality of fasteners.

The upper suspension frame includes a front upper structure and a rear upper structure. The rear upper structure extends downward from a rear of the front upper structure. A first upper pivot ear extends downward from a first side and bottom of the rear structure. A second upper pivot ear extends downward from a second side and bottom of the rear structure. Each pivot ear includes a pivot bushing. A first upper yoke extends downward from a bottom and a first side of the front upper structure. A first upper slot in the first upper yoke is parallel to a lengthwise axis of the front drive axle. The first slot is sized to receive a body rod end of the first hydraulic cylinder. A second upper yoke extends downward from the bottom and a second side of the front upper structure. A second upper slot in the second upper yoke is parallel to a lengthwise axis of the front drive axle. The second slot is sized to receive a body rod end of the second hydraulic cylinder. The upper suspension frame is preferably fabricated from a casting. The lower suspension frame includes a lower structure, a front upright structure and a rear upright structure.

The lower structure includes an axle trough to provide clearance for the front drive axle. A first lower pivot ear extends from a first side and rear of the lower structure. A second lower pivot ear extends from a second side and the rear of the lower structure. A distance between outside surfaces of the first and second lower pivot ears is sized to be received by a distance between inner surfaces of the first and second upper pivot ears. The front upright structure extends upward from the lower structure in front of the axle trough. A front semi-circular groove is cut in a top of the front upright structure. The rear upright structure extends upward from the lower structure behind the rear axle trough. A rear semi-circular groove is cut is a top of the rear upright structure. A front bearing block includes a round inner bearing surface and a pair of front mounting flanges extending from opposing sides of an outer perimeter. A pair of fasteners are inserted through the front mounting flanges and threaded into the front upright structure. A rear bearing block includes a round inner bearing surface and a pair of rear mounting flanges extending from opposing sides of an outer perimeter. A pair of fasteners are inserted through the rear mounting flanges and threaded into the rear upright structure. The lower suspension frame is preferably fabricated from a casting.

A frame pivot pin includes a flange portion and a pin portion. The pin portion extends from a side of the flange portion. A plurality of holes are formed through the flange portion. A first frame pivot pin is inserted through the first upper and lower pivot ears and secured to the first upper pivot ear with a plurality of fasteners. A second frame pivot pin is inserted through the second upper and lower pivot ears and secured to the second upper pivot ear with a plurality of fasteners. Spherical bearings are retained in the body and rod ends of the pair of hydraulic cylinders. A pair of upper retention pins are inserted into the body ends of the hydraulic cylinders and retained in the first and second upper yokes. A pair of lower retention pins are inserted into the rod ends of the hydraulic cylinders and retained in the first and second cylinder yokes.

Accordingly, it is an object of the present invention to provide an independent front axle suspension, which reduces the amount of discomfort experienced by an operator from the front axle, relative to a dependent front axle which has little load dampening.

These and additional objects, advantages, features and benefits of the present invention will become apparent from the following specification.

DETAILED DESCRIPTION OF THE PREFERRED EMBODIMENTS

Figure 1:
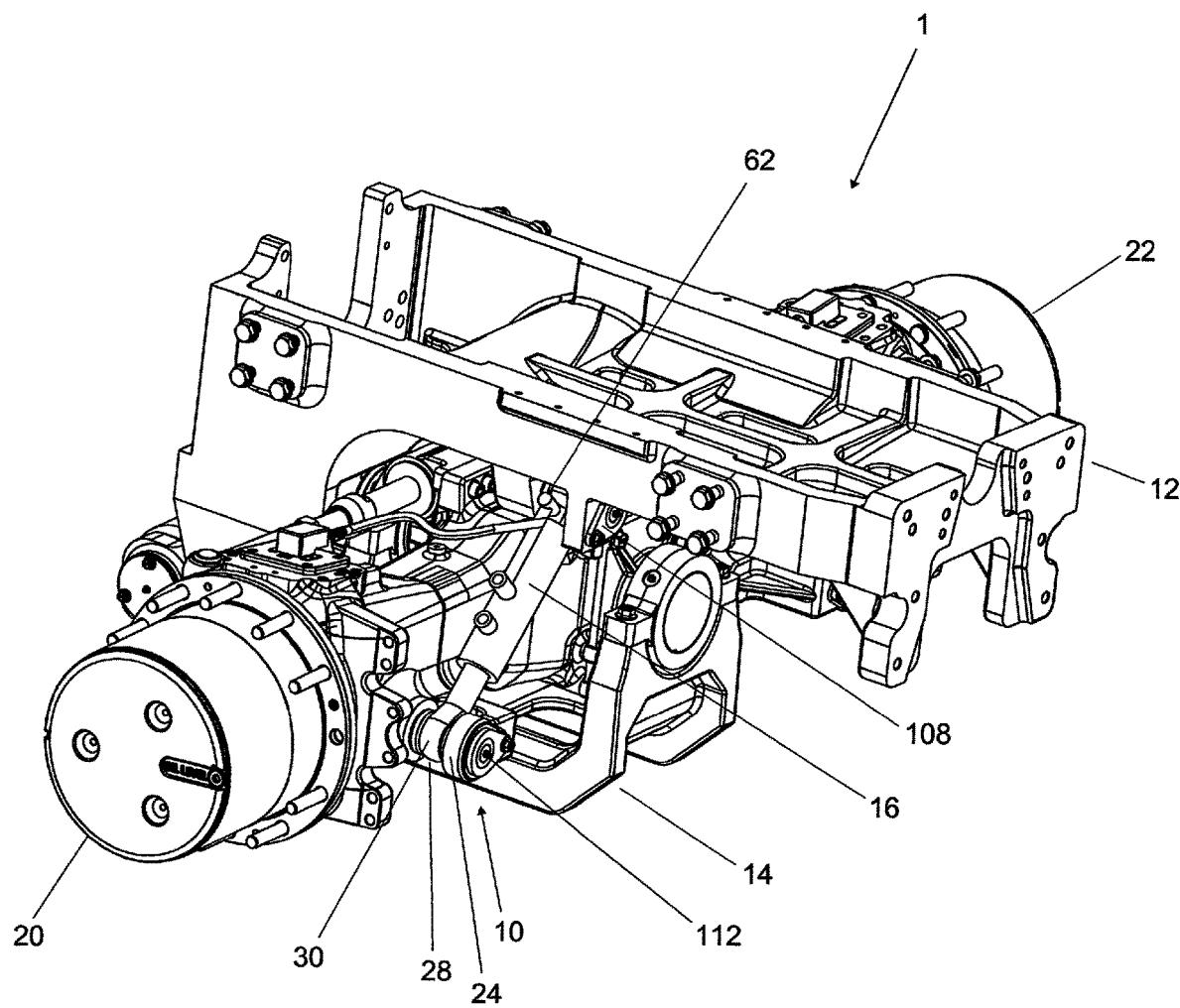
FIG. 1 is a perspective front view of a first end of an independent front axle suspension in accordance with the present invention.
Figure 2:
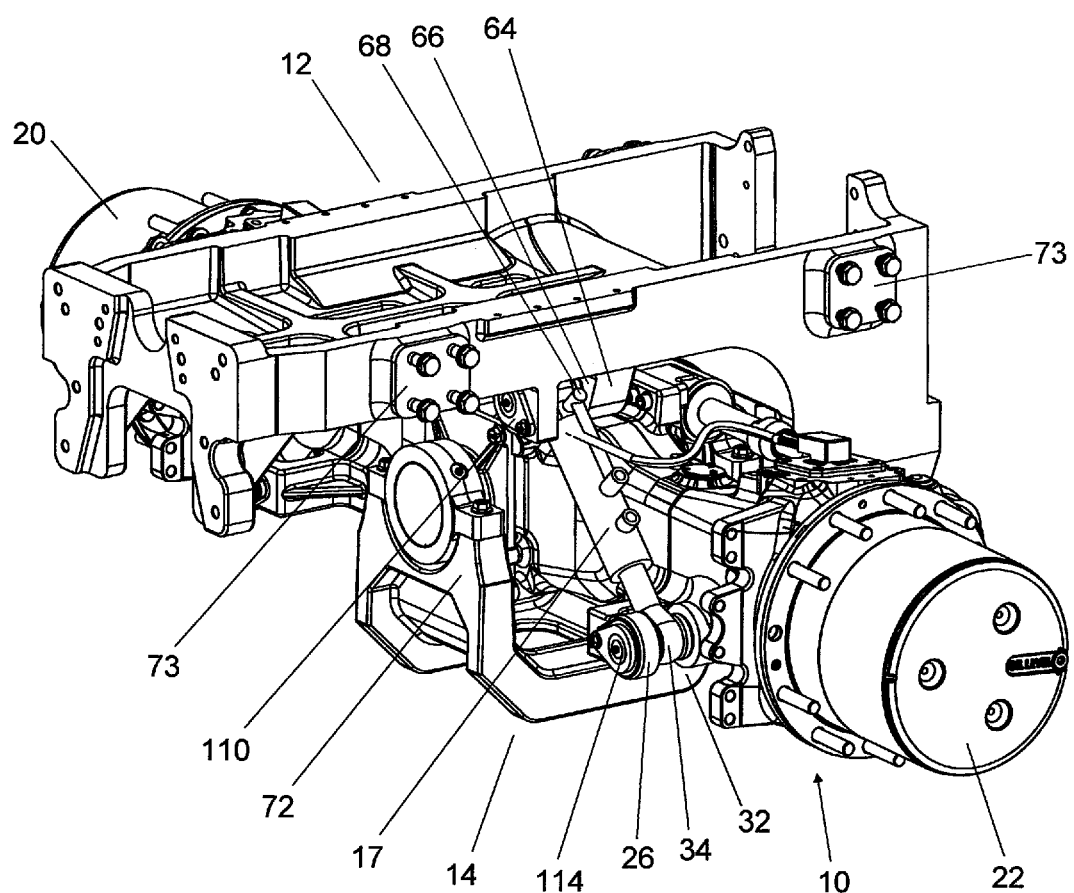
FIG. 2 is a perspective front view of a second end of an independent front axle suspension in accordance with the present invention.
Figure 3:
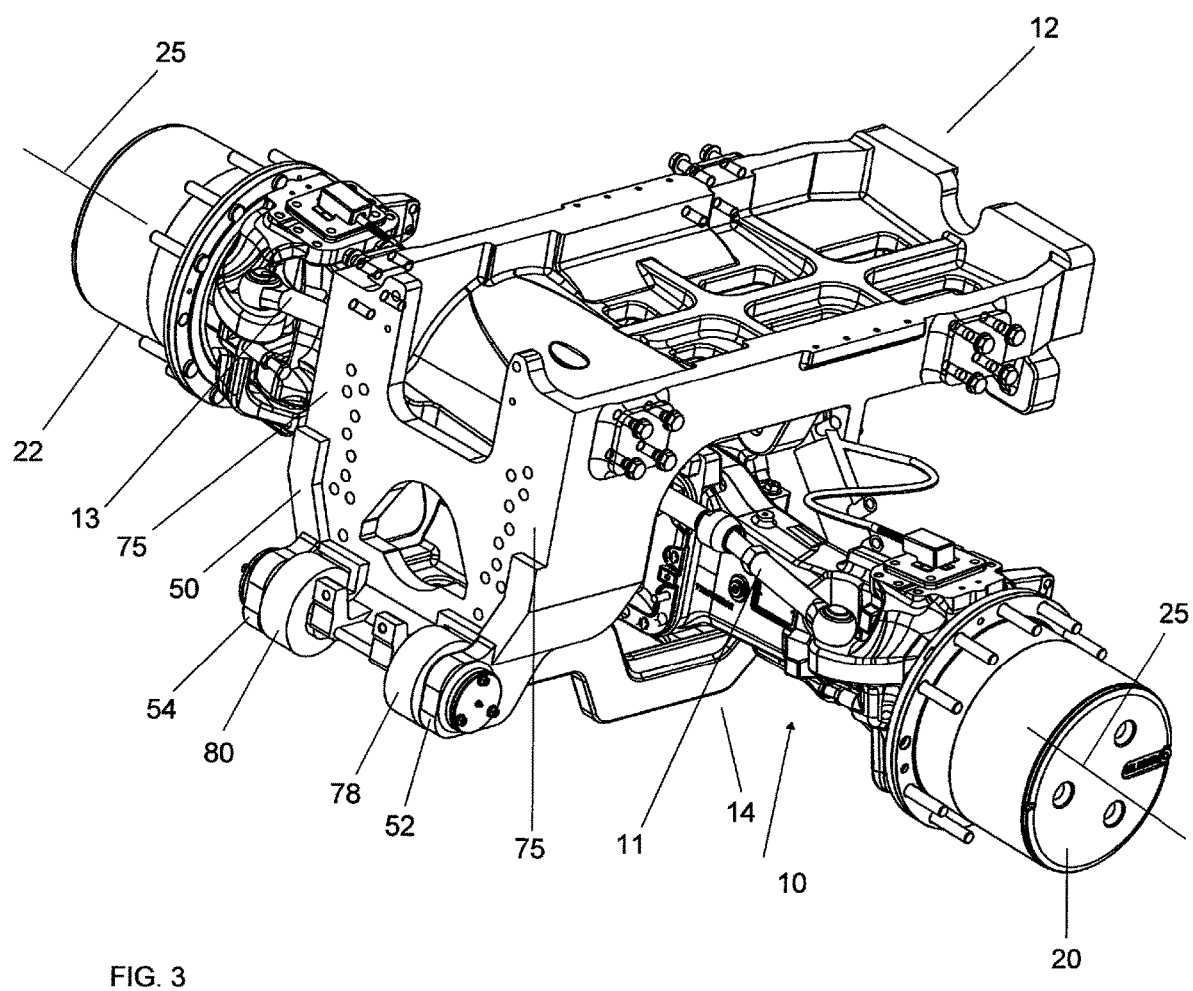
FIG. 3 is a perspective rear view of an independent front axle suspension in accordance with the present invention.
Figure 4:
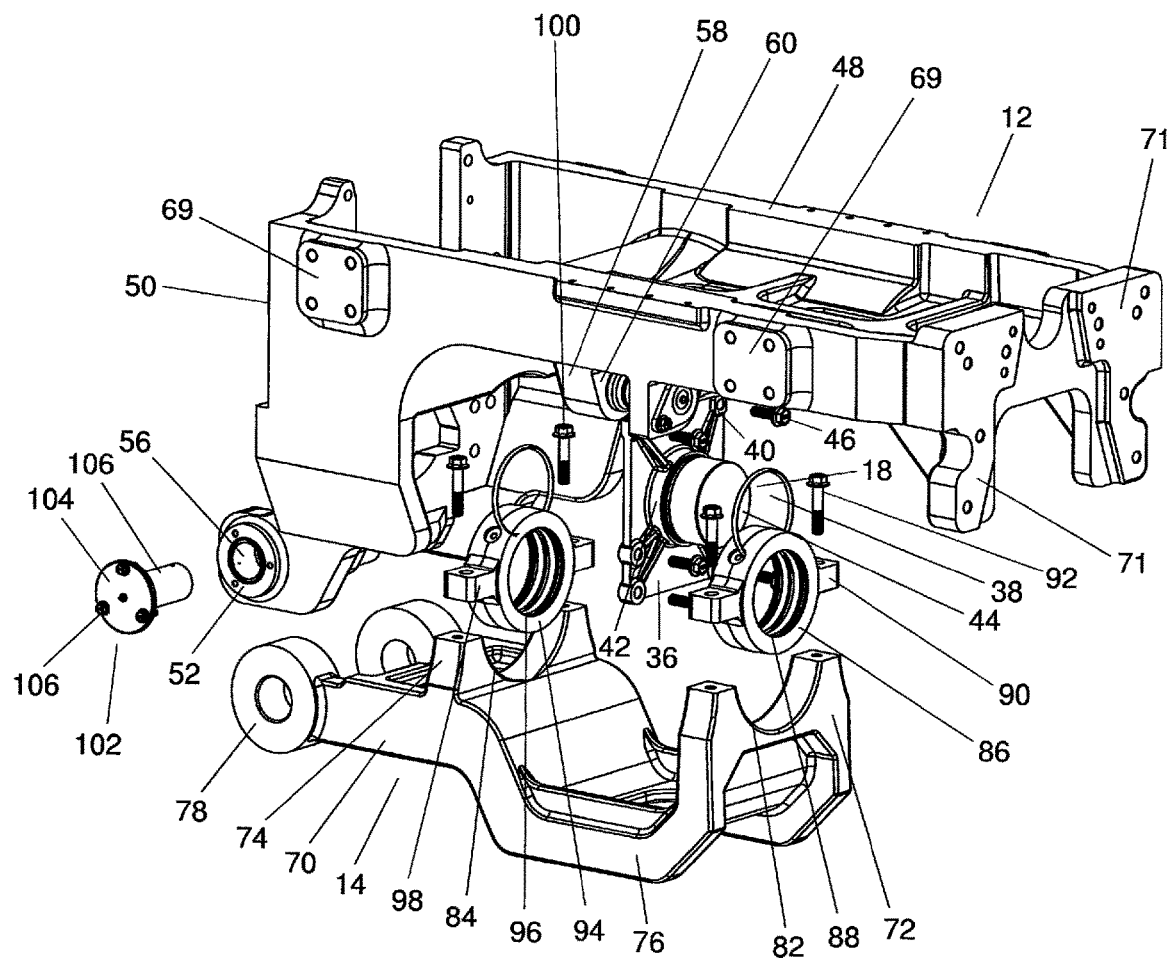
FIG. 4 is an exploded perspective front view of an upper suspension frame and a lower suspension frame with some components of an independent front axle suspension in accordance with the present invention.

With reference now to the drawings, and particularly to FIG. 1, there is shown a front perspective view of an independent front axle suspension 1. With reference to FIGS. 2-4, the independent front axle suspension 1 preferably includes a front drive axle 10, an upper suspension frame 12, a lower suspension frame 14, a pair of hydraulic cylinders 16, 17 and a pair of pivot plates 18. The front drive axle 10 includes a first drive spindle 20, a second drive spindle 22, a first cylinder yoke 24 and a second cylinder yoke 26. The first drive spindle 20 and the second drive spindle 22 may be pivoted relative to a lengthwise axis 25 of the front drive axle 10 with tie rods 11, 13 for the purposes of steering the first and second drive spindles 20, 22. The first drive spindle 20 extends from a first end of the front drive axle 10 and the second drive spindle 22 extends from a second end of the front drive axle 10.

The first cylinder yoke 24 is located on a front of the front drive axle 10, adjacent the first drive spindle 20. A first slot 28 in the first cylinder yoke 24 is parallel to the lengthwise axis 25 of the front drive axle 10. The first slot 28 is sized to receive a rod end 30 of the first hydraulic cylinder 16. The second cylinder yoke 26 is located on a front of the front drive axle 10, adjacent the second drive axle 22. A second slot 32 in the second cylinder yoke 26 is parallel to the lengthwise axis 25 of the front drive axle 10. The second slot 32 is sized to receive a rod end 34 of the second hydraulic cylinder 17. The pair of hydraulic cylinders 16, 17 may be replaced with any suitable pair of shock absorbing devices. Each pivot plate 18 includes a mounting base 36 and a pivot extension 38. The pivot plate 18 includes a plurality of mounting holes 40. The pivot extension 38 includes a base boss 42 and a pivot diameter 44, which extends outward from the base boss 42. A front pivot plate 18 is attached to a front and middle of the front drive axle 10 with a plurality of fasteners 46. A rear pivot plate (not shown) is attached to a rear and middle of the front drive axle 10 with the plurality of fasteners 46. The front and rear pivot plates 18 enable the front drive axle 10 to pivot in the lower suspension frame 14, perpendicular to the lengthwise axis 25.

The upper suspension frame 12 includes a front upper structure 48 and a rear upper structure 50. The rear upper structure 50 extends downward from a rear of the front upper structure 48. A first upper pivot ear 52 extends downward from a first side and a bottom of the rear upper structure 50. A second upper pivot ear 54 extends downward from a second side and the bottom of the rear structure 50. Each pivot ear 52, 54 preferably includes a pivot bushing 56. A first upper yoke 58 extends downward from a first side and a bottom of the front upper structure 48. A first upper slot 60 in the first upper yoke 58 is parallel to the lengthwise axis 25 of the front drive axle 10. The first slot 60 is sized to receive a body rod end 62 of the first hydraulic cylinder 16. A second upper yoke 64 extends downward from a second side and a bottom of the front upper structure 48. A second upper slot 66 in the second upper yoke 64 is parallel to the lengthwise axis 25 of the front drive axle 10. The second slot 66 is sized to receive a body rod end 68 of the second hydraulic cylinder 17. The upper suspension frame 12 is preferably fabricated from a casting. The first side of the front upper structure 48 preferably includes a plurality of first side mounting bosses 69. The front of the front upper structure 48 preferably includes a plurality of front mounting bosses 71. The second side of the front upper structure 48 preferably includes a plurality of second side mounting bosses 73. The rear of the rear upper structure 50 preferably includes a plurality of rear mounting bosses 75. The upper suspension frame 12 is secured to a portion of a tractor, such as the engine using the plurality of mounting bosses 69, 71, 73 and 75.

The lower suspension frame 14 includes a lower structure 70, a front upright structure 72 and a rear upright structure 74. The lower structure 70 includes an axle trough 76 to provide clearance for the front drive axle 10. A first lower pivot ear 78 extends from a first side and a rear of the lower structure 70. A second lower pivot ear 80 extends from a second side and the rear of the lower structure 70. A distance between outside surfaces of the first and second lower pivot ears 78, 80 is sized to be received by a distance between inner surfaces of the first and second upper pivot ears 52, 54. The front upright structure 72 extends upward from the lower structure in front of the axle trough 76. A front semi-circular groove 82 is cut in a top of the front upright structure 72. The rear upright structure 74 extends upward from the lower structure 70 behind the axle trough 76. A rear semi-circular groove 84 is cut is a top of the rear upright structure 74. A front bearing block 86 includes a round inner bearing surface 88 and a pair of front mounting flanges 90 extending from opposing sides of an outer perimeter of the front bearing block 86. A pair of fasteners 92 are inserted through the front mounting flanges 90 and threaded into the front upright structure 72. A rear bearing block 94 includes a round inner bearing surface 96 and a pair of rear mounting flanges 98 extending from opposing sides of an outer perimeter of the rear bearing block 94. A pair of fasteners 100 are inserted through the rear mounting flanges 98 and threaded into the rear upright structure 74. The lower suspension frame 14 has a shorter length than the upper suspension frame 12. The lower suspension frame 14 is preferably fabricated from a casting.

A pair of frame pivot pins 102 each include a flange portion 104 and a pin portion 106. The pin portion 106 extends from a side of the flange portion 104. A plurality of holes are formed through the flange portion 104 to receive a plurality of fasteners 106. A first frame pivot pin 102 is inserted through the first upper and lower pivot ears 52, 78 and secured to the first upper pivot ear 52 with the plurality of fasteners 106. A second frame pivot pin 102 is inserted through the second upper and lower pivot ears 54, 80 and secured to the second upper pivot ear 54 with the plurality of fasteners 106. Spherical bearings (not shown) are preferably retained in the first and second rod ends 30, 34 and the first and second body ends 62, 68 of the first and second hydraulic cylinders 16, 17. A pair of upper retention pins 108, 110 are inserted into the body ends 62, 68 of the pair of hydraulic cylinders 16, 17 and retained in the first and second upper yokes 58, 64. A pair of lower retention pins 112, 114 are inserted into the rod ends 30, 34 of the pair of hydraulic cylinders 16, 17 and retained in the first and second cylinder yokes 24, 26. A pivotal axis of the front drive axle 10 is perpendicular relative to a pivotal axis of the lower suspension frame 14 and the upper suspension frame 12.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

We claim:

1. An independent front axle suspension, comprising:
a front drive axle includes a first end and a second end;
an upper suspension frame;
a lower suspension frame is pivotally engaged with said upper suspension frame, said front drive axle is pivotally retained in said lower suspension frame, said front drive axle pivots perpendicular to a lengthwise axis thereof, a pivot axis of said upper and lower suspension frames is parallel to said lengthwise axis;
a first shock absorbing device having one end engaged with a first end of said front drive axle and an opposing end engaged with said upper suspension frame; and
a second shock absorbing device having one end engaged with a second end of said front drive axle and an opposing end engaged with said upper suspension frame.

2. The independent front axle suspension of claim 1 wherein:
said upper suspension frame includes a front upper structure and a rear upper structure, said rear upper structure extends downward from a rear of said front upper structure, a first upper pivot ear extends downward from a first side and a bottom of said rear upper structure, a second upper pivot ear extends downward from a second side and said bottom of said rear structure.

3. The independent front axle suspension of claim 2 wherein:
said lower suspension frame includes a first lower pivot ear and a second lower pivot ear, said first lower pivot ear extends from a first side and a rear of said lower suspension frame, said second lower pivot ear extends from a second side and said rear of said lower suspension frame, said first lower pivot ear is pivotally engaged with said first upper pivot ear, said second lower pivot ear is pivotally engaged with said second upper pivot ear.

4. The independent front axle suspension of claim 1 wherein:
said lower suspension frame includes a front upright structure and a rear upright structure, said front upright structure extends upward from a top of said lower suspension frame, said rear upright structure extends upward from a top of said lower suspension frame, a front of said front drive axle is pivotally retained by said front upright structure, a rear of said front drive axle is pivotally retained by said rear upright structure.

5. The independent front axle suspension of claim 4, further comprising:
a front bearing block is retained on said front upright structure, a rear bearing block is retained on said rear upright structure.

6. The independent front axle suspension of claim 5, further comprising:
a front pivot plate is attached to a front and middle of said front drive axle, a rear pivot plate is attached to a rear and said middle of said front drive axle, said front and rear pivot plates each include a mounting base and a pivot extension, said pivot extension extends from said mounting base, said front and rear bearing blocks are sized to pivotally receive said pivot extension.

7. The independent front axle suspension of claim 1 wherein:
said upper suspension frame includes a first upper yoke and a second upper yoke, said first upper yoke extends from a first side of said upper suspension frame, said second upper yoke extends a said second side of said upper suspension frame, said first and second upper yokes are sized to receive one end of said first and second shock absorbing devices.

8. The independent front axle suspension of claim 1 wherein:
said front drive axle includes a first cylinder yoke and a second cylinder yoke, said first cylinder yoke extends from said first end of said front drive axle, said second cylinder yoke extends from said second end of said drive axle, said first and second cylinder yokes are sized to receive an opposing end of said first and second shock absorbing devices.

9. An independent front axle suspension, comprising:
a front drive axle includes a first end and a second end;
an upper suspension frame;
a lower suspension frame is pivotally engaged with said upper suspension frame, said front drive axle is pivotally retained in said lower suspension frame, said front drive axle pivots perpendicular to a lengthwise axis thereof, a pivot axis of said upper and lower suspension frames is parallel to said lengthwise axis;
a first shock absorbing device having one end engaged with a first end of said front drive axle and an opposing end engaged with said upper suspension frame, at least one end of said first shock absorbing device is spherically engaged with at least one of said front drive axle and said upper suspension frame; and
a second shock absorbing device having one end engaged with a second end of said front drive axle and an opposing end engaged with said upper suspension frame, at least one end of said second shock absorbing device is spherically engaged with at least one of said front drive axle and said upper suspension frame.

10. The independent front axle suspension of claim 9 wherein:
said upper suspension frame includes a front upper structure and a rear upper structure, said rear upper structure extends downward from a rear of said front upper structure, a first upper pivot ear extends downward from a first side and a bottom of said rear upper structure, a second upper pivot ear extends downward from a second side and said bottom of said rear structure.

11. The independent front axle suspension of claim 10 wherein:
said lower suspension frame includes a first lower pivot ear and a second lower pivot ear, said first lower pivot ear extends from a first side and a rear of said lower suspension frame, said second lower pivot ear extends from a second side and said rear of said lower suspension frame, said first lower pivot ear is pivotally engaged with said first upper pivot ear, said second lower pivot ear is pivotally engaged with said second upper pivot ear.

12. The independent front axle suspension of claim 9 wherein:

said lower suspension frame includes a front upright structure and a rear upright structure, said front upright structure extends upward from a top of said lower suspension frame, said rear upright structure extends upward from a top of said lower suspension frame, a front of said front drive axle is pivotally retained by said front upright structure, a rear of said front drive axle is pivotally retained by said rear upright structure.

13. The independent front axle suspension of claim 9 wherein:
said upper suspension frame includes a first upper yoke and a second upper yoke, said first upper yoke extends from a first side of said upper suspension frame, said second upper yoke extends from a second side of said upper suspension frame, said first and second upper yokes are sized to receive one end of said first and second shock absorbing devices.

14. The independent front axle suspension of claim 9 wherein:
said front drive axle includes a first cylinder yoke and a second cylinder yoke, said first cylinder yoke extends from said first end of said front drive axle, said second cylinder yoke extends from said second end of said drive axle, said first and second cylinder yokes are sized to receive an opposing end of said first and second shock absorbing devices.

15. An independent front axle suspension, comprising:
a front drive axle includes a first end and a second end;
an upper suspension frame being capable of retention by a portion of a piece of mobile equipment;
a lower suspension frame is pivotally engaged with said upper suspension frame, said front drive axle is pivotally retained in said lower suspension frame, said front drive axle pivots perpendicular to a lengthwise axis thereof, a pivot axis of said upper and lower suspension frames is parallel to said lengthwise axis; and
a first shock absorbing device having one end spherically engaged with a first end of said front drive axle and an opposing end spherically engaged with said upper suspension frame; and
a second shock absorbing device having one end spherically engaged with a second end of said front drive axle and an opposing end spherically engaged with said upper suspension frame.

16. The independent front axle suspension of claim 15 wherein:
said upper suspension frame includes a front upper structure and a rear upper structure, said rear upper structure extends downward from a rear of said front upper structure, a first upper pivot ear extends downward from a first side and a bottom of said rear upper structure, a second upper pivot ear extends downward from a second side and said bottom of said rear structure.

17. The independent front axle suspension of claim 16 wherein:
said lower suspension frame includes a first lower pivot ear and a second lower pivot ear, said first lower pivot ear extends from a first side and a rear of said lower suspension frame, said second lower pivot ear extends from a second side and said rear of said lower suspension frame, said first lower pivot ear is pivotally engaged with said first upper pivot ear, said second lower pivot ear is pivotally engaged with said second upper pivot ear.

18. The independent front axle suspension of claim 15 wherein:
said lower suspension frame includes a front upright structure and a rear upright structure, said front upright structure extends upward from a top of said lower suspension frame, said rear upright structure extends upward from a top of said lower suspension frame, a front of said front drive axle is pivotally retained by said front upright structure, a rear of said front drive axle is pivotally retained by said rear upright structure.

19. The independent front axle suspension of claim 15 wherein:
said upper suspension frame includes a first upper yoke and a second upper yoke, said first upper yoke extends from a first side of said upper suspension frame, said second upper yoke extends from a second side of said upper suspension frame, said first and second upper yokes are sized to receive one end of said first and second shock absorbing devices.

20. The independent front axle suspension of claim 15 wherein:
said front drive axle includes a first cylinder yoke and a second cylinder yoke, said first cylinder yoke extends from said first end of said front drive axle, said second cylinder yoke extends from said second end of said drive axle, said first and second cylinder yokes are sized to receive an opposing end of said first and second shock absorbing devices.

* * * * *